United States Patent
Schray

[19]

[11] Patent Number: 5,970,675
[45] Date of Patent: Oct. 26, 1999

[54] MODULAR PANEL ASSEMBLY

[75] Inventor: Steven Schray, Bethlehem, Pa.

[73] Assignee: James D. Wright, Pen Argyl, Pa.

[21] Appl. No.: 08/985,491

[22] Filed: Dec. 5, 1997

[51] Int. Cl.[6] .................................................. E04B 2/74
[52] U.S. Cl. .......................... 52/582.1; 52/586.2; 52/710; 52/36.6; 160/135; 403/189
[58] Field of Search ................. 52/582.1, 584.1, 52/586.2, 36.4, 36.5, 36.6, 235, 271, 581, 800.15, 800.17, 800.18, 710, 698; 403/381, 252, 187, 189, 292; 160/135

[56] References Cited

U.S. PATENT DOCUMENTS

| | | | |
|---|---|---|---|
| 1,172,664 | 2/1916 | Banes | 52/800.17 X |
| 2,347,049 | 4/1944 | Green | 20/2 |
| 2,392,551 | 1/1946 | Roe | 72/38 |
| 3,348,459 | 10/1967 | Harvey | 94/13 |
| 3,778,175 | 12/1973 | Zimmer | 403/187 |
| 4,073,113 | 2/1978 | Oudot et al. | 52/710 |
| 4,689,929 | 9/1987 | Wright | 52/239 |
| 4,907,388 | 3/1990 | Siahatgar | 403/252 X |
| 4,953,338 | 9/1990 | Wilson et al. | 52/586.2 |
| 5,014,478 | 5/1991 | Spring | 52/586.2 X |
| 5,439,268 | 8/1995 | Dozsa-Farkas | 297/411.35 |
| 5,531,539 | 7/1996 | Crawford | 403/381 |

FOREIGN PATENT DOCUMENTS

| | | | |
|---|---|---|---|
| 13852 | 8/1980 | European Pat. Off. | 52/586.2 |
| 1254372 | 1/1961 | France | 52/584.1 |
| 1472384 | 3/1967 | France | 52/586.2 |

*Primary Examiner*—Carl D. Friedman
*Assistant Examiner*—Winnie S. Yip
*Attorney, Agent, or Firm*—Duane, Morris & Heckscher LLP

[57] ABSTRACT

A connector attaches panel elements such as wall panels, shelves, columns and the like to assemble modular structures. The connector frictionally engages the surfaces of elongated channels at the edge of the panels to be joined. The connector includes a contoured base section complementary with the channel of a first panel, to which the connector can optionally be screwed. A deformable cam section is carried on an intermediate section for receipt in the channel of the second panel. The cam section preferably has opposite cantilever arms which engage flanges of the anchor channels and the arms are tapered to deform inwardly of the channel for friction and inwardly from the joint so as to draw the panels together.

15 Claims, 5 Drawing Sheets

MODULAR PANEL ASSEMBLY

BACKGROUND OF THE INVENTION

1. Field of the Invention

This invention relates to connectors for joining panel elements for building modular structures. Anchor members having longitudinally oriented channels are mounted to, or formed integrally on, the edge of panel elements. The base of a connector member is fixedly attached within the channel of a first anchor located on a first panel element. The connector member has a deformable cam section which frictionally engages surfaces within the slot of a second anchor located on a second panel element, thereby securing the first panel to the second panel.

2. Prior Art

Prefabricated panel elements are used to construct modular structures such as partitions, temporary walls, shelves and the like, one example being portable displays for trade shows, etc. The panel elements are usually connected together in an edgewise abutting manner by connectors, such as a snap fittings or couplings, which are mounted to or formed integrally with the panel elements, allowing for quick assembly of the panel elements.

There is a tradeoff between static coupling structures for the panels and movable ones. Static connecting structures may be too tight to make the attachment of the panels smooth and easy, for example when they are new, and/or too loose to provide good structural support after they become worn.

A drawback to many connectors is that they require tools or special implements in order to attach the panel elements together. For example, the panel fasteners may be adjustable such that they can loosely attach panels, and have threaded fasteners, cammed structures or the like which are tightened or deployed after the panels are assembled, using a screwdriver or allen wrench. Tightening threaded fasteners, or tooled operation on another type of connector, is inconvenient and increases the time required to assemble a modular structure. Panel connections without tools are faster and more convenient, for example using connection structures that are inserted into suitable receptacles and lock when the panels are moved relative to one another. However, issues respecting connection tightness versus ease of connection (as well as ease of disconnection) are presented.

Apart from how tight or loose a connecting structure may engage, assembled panels should abut directly without gaps. Structural integrity is improved by direct abutment of the panel edges. Gaps between panels detract from the aesthetic appeal of the structure, for example causing it to appear of a low quality. Some types of connectors include components external to the panel element, which also may be aesthetically objectionable and may interfere with the direct abutment of the panel elements.

A connector structure for the edgewise attachment of panels is disclosed in U.S. Pat. No. 5,531,539—Crawford. Crawford discloses abutting panels with dovetail grooves along their abutting edges. The dovetail grooves on two abutting panels receive the opposite dovetail tenons on the ends of an elongated connector. The panels can be moved relative to one another only parallel to their abutting edges (typically vertically) and horizontal forces that might cause a gap between the panels are opposed by engagement of the tenons in the dovetail slots.

With a connector such as in Crawford, close tolerances are required for the dimensions of the connectors and for the dovetail slots to obtain a tight fit between panels. If the tenons are loose in the slots (i.e., too small), the panel joint is loose and may gap. If the tenons are tight in the slots (i.e., too large), the fastener must be forced to slide in the slot, for example by hammering on the panels. In addition, since the slots extend from one end of the panel to the other (e.g., top to bottom), it is necessary to slide the bottom edge of one past the top edge of the other, or vice versa, to move the fastener into the slot. If the assembled panel elements are to be placed in a tight corner or other restricted space with low clearance, the elongated connector cannot be inserted and the modular structure must be assembled elsewhere before it can be moved into place. Moving the modular structure normally is disadvantageous and may stress the connecting member(s).

Another example of a panel assembly is disclosed in U.S. Pat. No. 4,689,929—Wright. Wright teaches a button type fastener having a small diameter base attached to a first panel and a larger diameter outer button on the base. The larger diameter button is inserted into a slot extending a short distance from the end of a second panel to affix the panels together. The edges of the slot rest on either side of the base. The connection between panels in Wright has the same problems as above. Making such a connector element fit tightly in the slot leads to assembly difficulties, and making it fit loosely detracts from the fit and structural integrity of the assembled panels, particular because the button-type connector is relatively free to move in the slot.

It would be desirable to provide a connector for panel elements which is concealed within the panels, allows for assembly of modular element without tools, maintains successive panels in tight abutment without gaps, and resolves the tradeoff between tightness and looseness without requiring highly accurate dimensional tolerances.

SUMMARY OF THE INVENTION

It is an object of the invention to provide a connector for panel elements which is concealed within the panels.

It is an object of the invention to provide a connector for panel elements which maintains a tight fit between successive panels.

It is another object of the invention to provide a connector for panel elements which allows for assembly of a modular structure without tools.

These and other objects are accomplished by a connector member which frictionally engages the surfaces of elongated channels or anchor members attached along the edges of successive panels. The connector member includes a contoured base, an intermediate section, and a deformable cam section. The base section can be shaped to complement the contour of the bottoms of the anchoring channels. The cam section is carried on the base of the connector by a flexible transition section. The cam section comprises at least two cantilevers intended to engage inner surfaces of the elongated anchor channels of an abutting panel. Each of the cantilevers extends from a portion of the transition section at an end of the connector and bears laterally outwardly such that inward pressure on a cantilever applies a torque to the respective portion of the transition section. The base, transition section and cantilevers can be integrally formed of a durable but resilient plastic. Screws or other fasteners extend through apertures located at the transition section portions at opposite ends of the connector member and extend into the bottom of the anchor channel to affix the connector to the panel.

The channels have a bottom retaining wall, two side walls, and opposing flanges which have an opening between them defining a slot. One or more tapered enlargements in the slot between the flanges are provided along the anchor channel and admit the connector members of a next panel being spaced along the edge of the next panel. Optionally, both abutting panels can have connectors affixed in their channels in a pattern that is offset relative to the connectors of the next panel. The connector member is inserted into the enlargement of the anchor channel of the next panel. Relative displacement of the panels slides the connector along the channel from the enlargement into a narrower length of the slot between enlargements, and laterally inward compression of the cantilever arms permits a relatively tight fit that is nevertheless smoothly operated.

The base section fits in the anchor channel with upper surfaces of the base section engaging against the inner sides of the opposing flanges. The base section is attached in the anchor channel of the first panel by threaded fasteners through the apertures into the bottom wall of the anchor channel. The intermediate section of the connector protrudes upward from the base section of the connector through the opening between the opposing flanges and places the cantilever section at a space above the outer sides of the flanges. This space is substantially as wide as the thickness of the flanges on the second panel, such that when the base is affixed in the first panel anchor channel and the cantilever section is inserted and slides along the anchor channel of the second panel, the panels abut tightly and are securely mechanically attached.

Additional objects and aspects of the invention will become apparent from the following discussion of certain preferred embodiments and practical examples.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

DETAILED DESCRIPTION OF THE INVENTION

Figure 1:
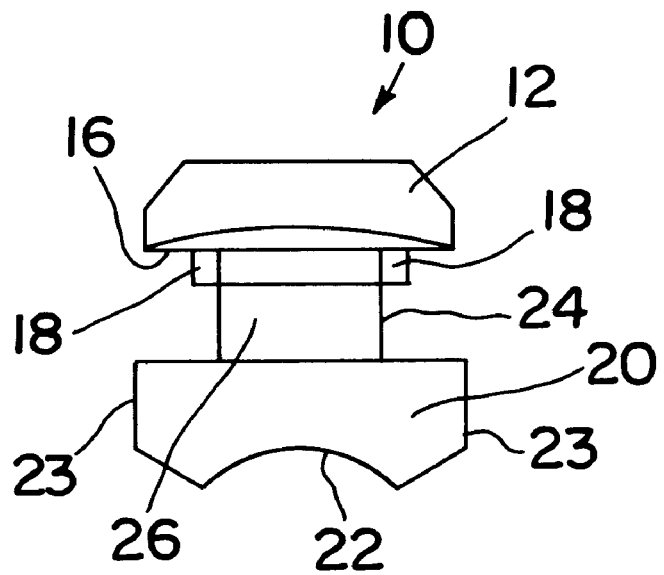
FIG. 1 is an elevational view of a connector member as viewed from an end (i.e., along an anchor channel slot)

The invention is described in detail with reference to the accompanying drawings in which the same reference numerals are used throughout to identify corresponding elements.

Figure 4:
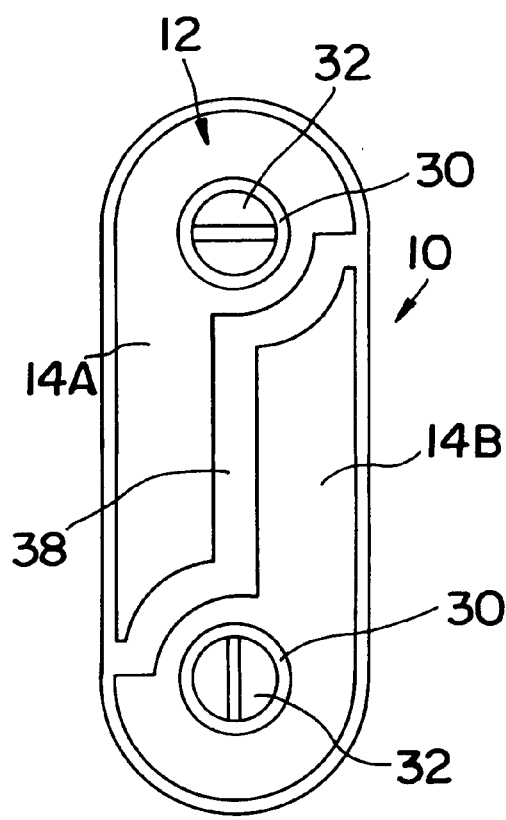
FIG. 4 is a plan view of the connector member.
Figure 5:
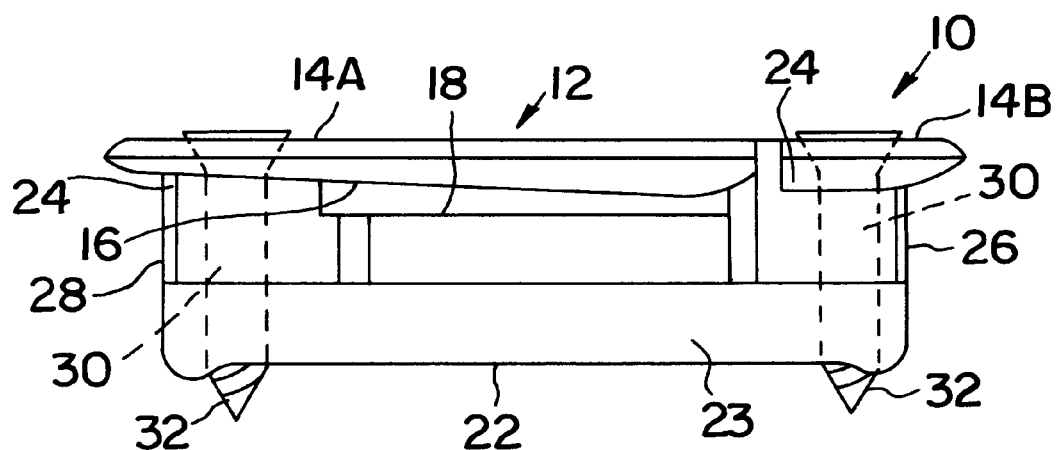
FIG. 5 is a side elevational view of a connector member.

A connector member 10 according to the invention is best shown in FIGS. 1, 4 and 5. The connector member 10 can be constructed from a durable but flexible material such as polyvinyl chloride, high impact polystyrene, glass filled nylon or a similar plastic, or another resilient and durable material such as aluminum, brass or steel.

As formed of plastic such as glass filled nylon, connector 10 can be a single piece injection molded part integrally formed with a base 20 having a cam 12 spaced from base 20 by an intermediate section 24. Base section 20 has a contoured lower surface 22, sidewalls 23 and an upper bearing surface on which intermediate section 24 is spaced inwardly from sidewalls 23. Base section 20 is complementary with an elongated cavity 42 of an anchoring channel 46, shown in FIG. 2, which is rigidly affixed to the edge of one of two panels or similar structural units that are to be attached using connector 10.

Referring again to FIGS. 1, 4 and 5, a cam section 12 is carried on base 20 by an intermediate section 24. Intermediate section 24 tapers to a round point at its front edge 26 and rear edge 28, and the thickness of the cantilever arms likewise can increase inwardly from a chamfer at the edge, in order to facilitate insertion of connector member 10 into an anchoring channel or extrusion as described in greater detail below.

Cam section 12 comprises at least one and preferably two opposed cantilever arms 14A and 14B. As shown in FIGS. 4 and 5, intermediate section 24 has two separate sections, each forming a hub for receiving a fastener 32 and carrying one of the cantilever arms 14A and 14B, which extend down the sides of connector 10 in a parallel, congruent and opposite arrangement. Cantilever members 14A and 14B also could be mounted in a non-congruent or symmetrical manner, but in any event are arranged to permit limited inward deformation while bearing outwardly.

Extending through each cam or cantilever member 14A, 14B and through the integral intermediate section 24 and base 20 are apertures 30 for fasteners 32, which preferably are flat head sheet metal screws that fit in countersunk openings. The fasteners 32 attach connector 10 to the bottom of the anchor channel 42 of one of the panels.

Figure 2:
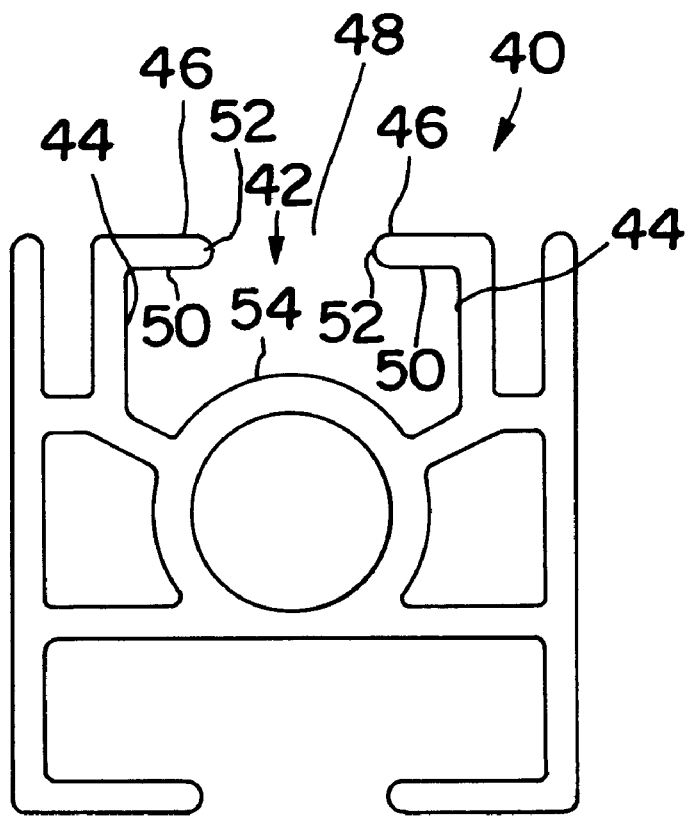
FIG. 2 is an end elevation of an elongated anchor member.

Base section 20 is received within an elongated channel 42, which is preferably an extrusion formed integrally with elongated anchor 40, as shown in FIG. 2. Intermediate section 24 protrudes through a slot defined between inward facing flanges in the channel and carries cam 12 at a space from the flanges. The elongated anchors 40 including channels 42 are attached along the edges of panel elements which are to be connected together to form a modular structure such as a wall, a shelf, a panel attached to a corner post, etc. The channel has opposing flanges 46 along its length, which vary in their spacing between narrower slots and enlargements 56 dimensioned to allow the insertion of connector 10. On at least one of the panels, the base of connector 10 is inserted at an enlargement and slid into the slot where it is rigidly attached by fasteners 32. The protruding cam 12 of this connector can then be inserted into the enlargement of a second panel and slid along the slot, thereby securely but removably attaching the two panels.

Figure 3:
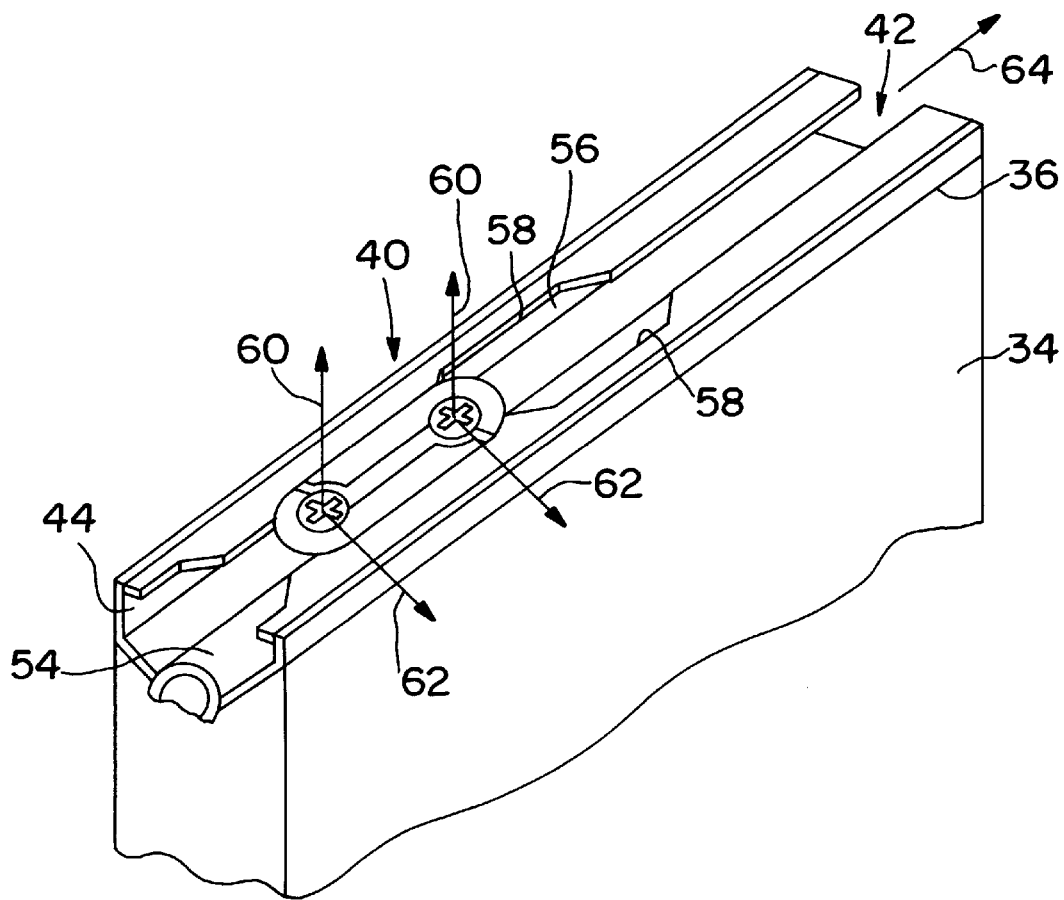
FIG. 3 is a perspective view showing the connector member mounted in the anchor channel of a first panel element.
Figure 6:
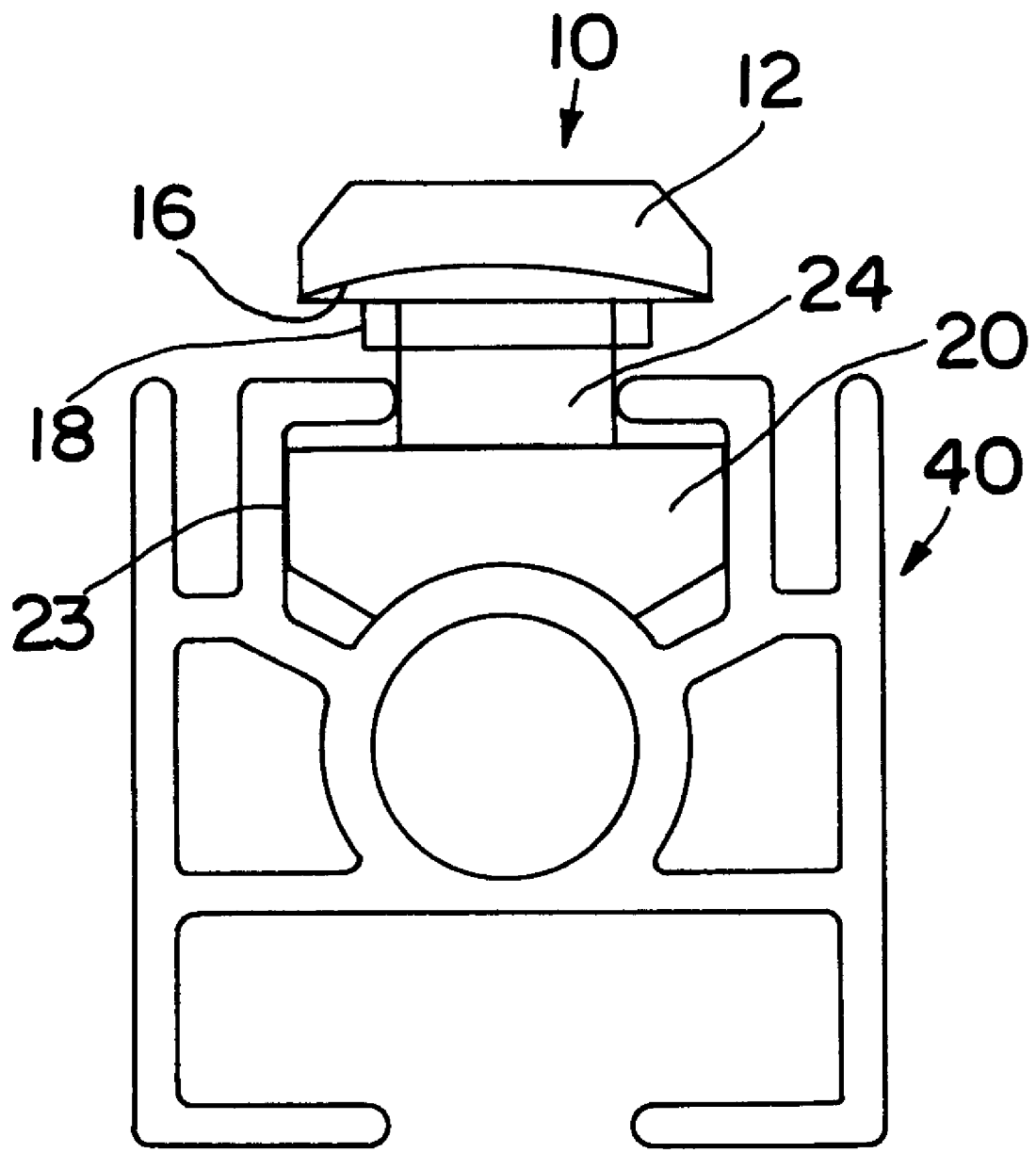
FIG. 6 is a section view showing the connector member mounted in the anchor channel of a first panel and attaching the first panel to a second panel.

FIGS. 3 and 6 show the base section 20 of the connector member 10 received within channel 42 located on elongated anchor 40. Elongated anchor 40 is rigidly attached or formed integrally with the edges 36 of each of the modular elements, such as panels 34, to be connected together. As shown in FIG. 2, anchor 40 defines a channel 42 which is formed by a bottom retaining wall 54, two side walls 44, and opposing flanges 46 which define an opening 48 between them. Channel 42 is contoured in cross section and frictionally engages the surfaces of the connector member 10, as will be described in greater detail below, it being understood that the components of connector member 10, such as the cam section 12, the base 20 and the intermediate section 24, can be proportioned relative to each other in a different manner than illustrated in FIGS. 1, 3, 4, 5 and 6. For example, base section 20 can be wider than cam section 12 or vice-versa. Regardless of the proportioning of connector member 10, channel 42 will have a cross-section which engages the surfaces of connector 10 in the manner to be described below. Solely for the purposes of illustrating the operation of the present invention, channel 42 is illustrated so that the bottom retaining wall has a contour which is complementary with that of base 20. Tapered enlargements 56 are spaced in a longitudinal direction along opening 48 to allow for insertion and locking of a connector member 10 within the channel 42, namely by inserting the connector 10 and aligning it to an enlargement of the next panel or other modular element, and relatively sliding the two modular elements to move connector 10 into a narrow part of the slot.

Pre-formed holes for receiving fasteners 32 can be located within retaining wall 54 of channel 42 at narrow portions of opening 48. Base section 20 of connector member 10 is inserted into an enlargement of channel 42 of a first anchor 40 at a tapered enlargement 56 and the connector 10 is slid inward from the enlargement 56 in a longitudinal direction along channel 42 over the holes in bottom wall 54. When base 20 is disposed in channel 42, the outer bearing surfaces 23 and contoured bottom of base section 20 frictionally engage the inside walls of channel 42. Friction is sufficient to hold the position of connector 10 along channel 42 by suitably sizing base 20. The fit for base 20 is made relatively tighter than the fit of cam section 12 in an opposed panel so that less effort is needed to attach panels than to fix connector 10 in position on its base panel. Threaded fasteners 32 can be inserted through apertures 30 and screwed into bottom retaining wall 54, preferably at preformed holes, for providing additional forces to hold to position of the connector member along channel 42. However, fasteners 32 are only necessary where the fit of base 20 within channel 42 allows for movement of connector 10.

With the base section 20 substantially permanently secured in channel 42, intermediate section 24 protrudes upwardly through opening 48 between the opposing flanges 46, positioning cam 12 for engagement with a second panel. This is accomplished by edgewise abutting the two panels so that cam section 12 of connector 10 is inserted into a tapered enlargement 56 of a similar channel on a second panel. The panels are then moved in a longitudinal direction 64 relative to each other, sliding cam section 12 along channel 42 inward from the tapered enlargement 56. In an embodiment having regularly spaced enlargements 56, the panels can be relatively moved by half the distance between enlargements. Cantilever members 14A, 14B engage the inner surfaces of channel 42 of the second panel behind flanges 46. The two panels are secured together in close abutment.

Figure 7:
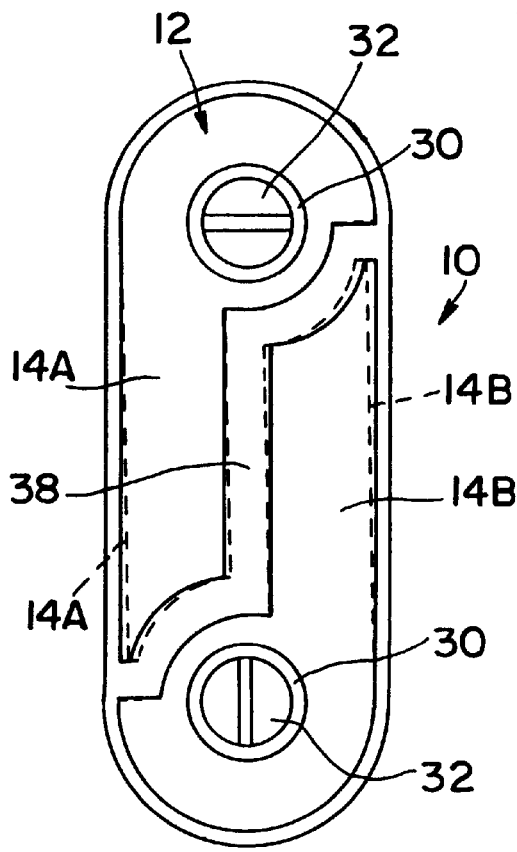
FIG. 7 is a partial plan view showing deflection of the cantilever members in a direction lateral to a plane of the intermediate transition section, the transition section being shown in broken lines.

On the bottom of each cantilever member 14A, 14B are a rear surface 18 and a lower bearing surface 16, both of which are inclined downwardly from the ends of cam 12 toward the center. Surfaces 16, 18 are engaged by specific surfaces of the channel 42 such that cantilever members 14A, 14B are resiliently flexed. As cam section 12 slides from enlargement 56 into a narrow section between flanges 46, the slanted edges 58 of the enlargement and the edges 52 of the flange engage inclined surface 18, causing cantilever members 14A, 14B to rotate about respective vertical axes 60 corresponding to the hubs of intermediate section 24. The cantilever members flex in a direction lateral to the plane of flanges 46 (see FIG. 7, where the lateral deflection of the cantilever members is shown in broken lines). In this manner, cantilever members 14A and 14B exert an outward force on the side walls 44 of the channel 42, providing secure engagement and frictional resistance preventing the panels from sliding relative to one another in longitudinal direction 64.

Figure 8:
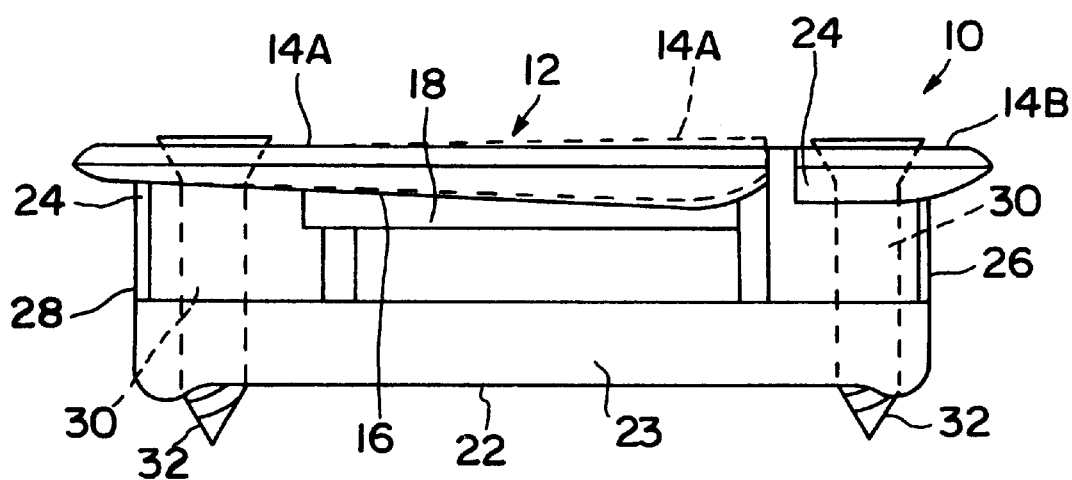
FIG. 8 is a partial elevation view showing deflection of the cantilever members in a direction normal to a plane of the intermediate section.

Referring to FIGS. 1–3, each cantilever 14A, 14B is biased toward the bottom retaining wall 54 of channel 42 in which its base section 20 is disposed. As cam section 12 slides inward from enlargement 56, the slanted lower bearing surface 16 is engaged by the inner face 50 of flange 46, urging each flange to flex about axis 62, in a direction normal to the plane of flanges 46 and opposite to the direction in which each cantilever member 14A and 14B is biased (see FIG. 8, where the normal deflection of the cantilever members is shown in broken lines). As a result, the cantilever members 14A, 14B exert a downward force which draws the two panels together in a closely abutting relationship. More particularly, in addition to providing a frictional engagement, the cams are structured to pull the panels toward one another at the joint.

As shown in FIG. 4, an interstitial space 38 exists between cantilever members 14A, 14B. The degree to which the cantilever members 14A, 14B can flex can be adjusted, for example, by varying the width of space 38 (effectively making cantilevers 14A, 14B thicker or thinner) or by filling space 38 with an elastic filler material. Suitable fillers include rubber, urethane or the like. Resilient filler material in the interstitial space resists inward flexing of the cantilever members and increase the outward force exerted on side walls 44. Similarly, insofar as the filler material is bonded to the cantilevers 14A, 14B, the filler material restricts deformation of cantilever members 14A and 14B in a direction normal to the plane of flanges 46 and increases the force drawing the two panels together.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. An apparatus for joining at least two panels in an abutting relationship, each of the panels defining an elongated anchor along abuttable edges of the panels with an elongated channel formed by a bottom wall, two side walls, and opposing flanges defining an opening forming a slot, the apparatus comprising:

at least one resilient connector member, comprising a base section, a cam section and a transition section between the base section and the cam section, the base section having a cross section whereby the base section can be received in the channel of a first said elongated anchor complementary to the base section on one of the panels and the cam section can be inserted into the channel of a second elongated anchor on a second said panel complementary to said cam section for affixing the panels;

wherein the cam section is resiliently deformable whereby the cam section can compressibly engage surfaces behind the flanges of said second elongated anchor, with the base section adopted to bear against an inner face of the flange of the first elongated anchor and the cam section adopted to bear against an inner face of the flange of the second elongated anchor for holding the two abutting panels together; and, wherein the cam section comprises first and second cantilever members pivotally mounted to said transition section, said cantilever members being resiliently deformable in a lateral and a normal direction relative to the transition section and a plane of the flanges of the channel of the second said panel.

2. The apparatus of claim 1 further comprising a securing means on the resilient connector member whereby said connector member can be secured to the first elongated anchor.

3. The apparatus of claim 2 in which the resilient connector member includes at least one aperture through the base, cam and transition sections.

4. The apparatus of claim 3 in which the securing means comprises a threaded fastener which is received within said aperture.

5. The apparatus of claim 1 in which the cantilever members include an inclined surface engageable with edges of the flanges, whereby the cantilever members are deformed in a lateral direction relative to the plane of the flanges as said connector slides along the slot in a direction inward from an enlargement of the slot of the second said panel.

6. The apparatus of claim 5 in which the cantilever members include a slanted lower bearing surface which is, engageable with the inner surface of the flanges whereby the cantilever members are deformed in a normal direction relative to the plane of the elongated flanges as said connector slides along the slot beyond the enlargement.

7. The apparatus of claim 1 in which the transition section is tapered at a front and a rear edge.

8. In combination, a pair of abuttable slotted panels and a resilient connector apparatus for joining the slotted panels said resilient connector apparatus comprising:

a base section contoured to fit within a channel located on a first of the panels;

a cam section mounted to said base section by a transition section, said cam section being resiliently deformable to compressibly engage a surface of a channel located on a second of the panels;

said transition section positioning at least one face of the base section against an inner face of the channel of the first panel and at least one face of the cam section against the channel of the second panel whereby the first and second panels are held in fixed relationship; and, wherein the cam section comprises first and second cantilever members pivotally mounted to said transition section, said cantilever members being resiliently deformable in a lateral direction and in a normal direction relative to the channel of the second panel.

9. The combination of claim 8 in which the resilient connector apparatus is secured to the first channel by a securing means.

10. The combination of claim 9 in which the resilient connector apparatus includes at least one aperture through the base, cam and transition sections.

11. The combination of claim 10 in which the securing means comprises a threaded fastener which extends through said at least one aperture.

12. The combination of claim 8 in which the cantilever members include a inclined surface which engages the surfaces of the channel of the second panel whereby the cantilever members are deformed in a lateral direction relative to the plane of the channel of the second panel.

13. The combination of claim 12 in which the cantilever members include a slanted lower bearing surface which engages the surfaces of the channel of the second panel whereby the cantilever members are deformed in a normal direction relative to the plane of the channel of the second panel.

14. The combination of claim 8 in which the transition section is chamfered at a front and a rear edge of the resilient connector member.

15. An apparatus, comprising:

at least two panels positionable in an abutting edge-to-edge relationship;

an elongated anchor joined along each of two abutting edges of the panels, each said elongated anchor having an elongated slot formed by a retaining wall, two side walls, and opposing flanges having an opening therebetween;

at least one resilient connector member secured to said elongated slot of a first said elongated anchor located on a first said panel by a fastening means, the resilient member comprising a base section, a cam section and a transition section extending between the base section and the cam section;

the base section having an underside shaped to match a contour of the retaining wall and being sized to fit snugly within the elongated slot in said first elongated anchor located on said first panel;

the cam section comprising a first and a second cantilever member pivotally mounted to the transition section whereby said cantilever members are resiliently deformable in a lateral direction and a normal direction relative to the plane of the elongated slot of a second said elongated anchor on a second said panel so as to engage surfaces of said elongated slot of said second anchor; and, the transition section holding at least one face of the base section in juxtaposition to an inner face of said flange on the first elongated anchor and at least one face of the cam section against an inner face of said flange on a second elongated anchor whereby the two abutting panels are held in fixed edge-to-edge relationship.

* * * * *